(12) United States Patent
Kida et al.

(10) Patent No.: US 6,248,139 B1
(45) Date of Patent: Jun. 19, 2001

(54) METHOD OF MANUFACTURING A SEALED BATTERY

(75) Inventors: Yoshinori Kida, Katano; Toshikazu Yoshida, Hirakata; Ryuji Ohshita, Neyagawa; Toshiyuki Nohma; Koji Nishio, both of Hirakata, all of (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/268,314

(22) Filed: Mar. 16, 1999

(30) Foreign Application Priority Data

Mar. 16, 1998 (JP) .................................................. 10-087959

(51) Int. Cl.⁷ .................................................. H01M 10/38
(52) U.S. Cl. ......................... 29/623.2; 429/175; 429/185
(58) Field of Search .......................... 29/623.2; 429/184, 429/175, 185

(56) References Cited

U.S. PATENT DOCUMENTS

| | | | |
|---|---|---|---|
| 4,904,550 | * | 2/1990 | Kano et al. . |
| 5,409,777 | | 4/1995 | Kennedy et al. .................. 428/411.1 |
| 5,580,678 | | 12/1996 | Rossoll ................................ 429/163 |
| 5,612,153 | | 3/1997 | Moulton et al. ...................... 429/191 |

FOREIGN PATENT DOCUMENTS

| 1-183061 | 7/1989 | (JP) . |
|---|---|---|
| 1-186552 | 7/1989 | (JP) . |
| 8-287889 | 11/1996 | (JP) . |

* cited by examiner

Primary Examiner—John S. Maples
(74) Attorney, Agent, or Firm—Kubovcik & Kubovcik

(57) ABSTRACT

The opening to be sealed in a battery is sealed with an electrical insulating sealant S by placing an electrical insulating sealing material C, including a first sealing material A that is soften by heat applied for sealing and a second sealing material B that is more difficult to soften by the heat applied for sealing than the first sealing material A, and by heating and successively cooling the electrical insulating sealing material C. Thus, a sealed battery with few defectives such as a sealing failure and a short-circuit can be manufactured in a high yield rate.

4 Claims, 2 Drawing Sheets

METHOD OF MANUFACTURING A SEALED BATTERY

BACKGROUND OF THE INVENTION

This application claims the priority of Japanese Patent Application No. 10-87959 filed on Mar. 16, 1998, which is incorporated herein by reference.

The present invention relates to a sealed battery and a method of manufacturing the sealed battery.

Sealing of a battery for preventing leakage of the electrolyte solution and protecting a water reactive active material used therein is conventionally conducted by placing a sealing material on the opening of the housing of the battery, and melting and then cooling the sealing material thereon.

In this sealing process, when the opening of the battery requires prevention of a short-circuit, a sealing material with an electrical insulating property is particularly used.

Therefore, any of electrical insulating materials, such as polyethylene and polypropylene, that can be adhered to the housing when thermally molten by heat applied for sealing was used as the conventional sealing material.

However, such a conventional heat-melting adhesive sealing material can easily flow out of the opening during the sealing process, and hence, the sealing tends to be incomplete. Such incomplete sealing can result in leakage of the electrolyte solution and a short life of the battery. Also, in the case where the sealing material also serving as the electrical insulating material flows out, a short-circuit can be easily caused when the housing is slightly deformed by the sealing heat, resulting in decreasing the yield rate of batteries.

SUMMARY OF THE INVENTION

In consideration of the aforementioned conventional disadvantages, an object of the invention is providing a sealed battery with few defectives such as a sealing failure and a short-circuit and a method of manufacturing the sealed battery in a high yield rate.

The method of manufacturing a sealed battery of this invention comprises a step of forming an electrically insulating sealant S for sealing an opening by placing an electrical insulating sealing material C, including a first sealing material A that is molten by heat applied for sealing and a second sealing material B that is more difficult to soften by the heat applied for sealing than the first sealing material A, on the opening and by heating and successively cooling the electrical insulating sealing material C.

Alternatively, the sealed battery of this invention comprises an electrical insulating sealant S for sealing an opening, and the electrical insulating sealant S includes a first sealing material A that is molten by heat applied for sealing and a second sealing material B that is more difficult to soften by the heat applied for sealing than the first sealing material A.

In this manner, the invention provides a sealed battery with few defectives such as a sealing failure and a short-circuit and a method of manufacturing the sealed battery in a high yield rate.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein.

DETAILED DESCRIPTION OF THE INVENTION

Figure 1:
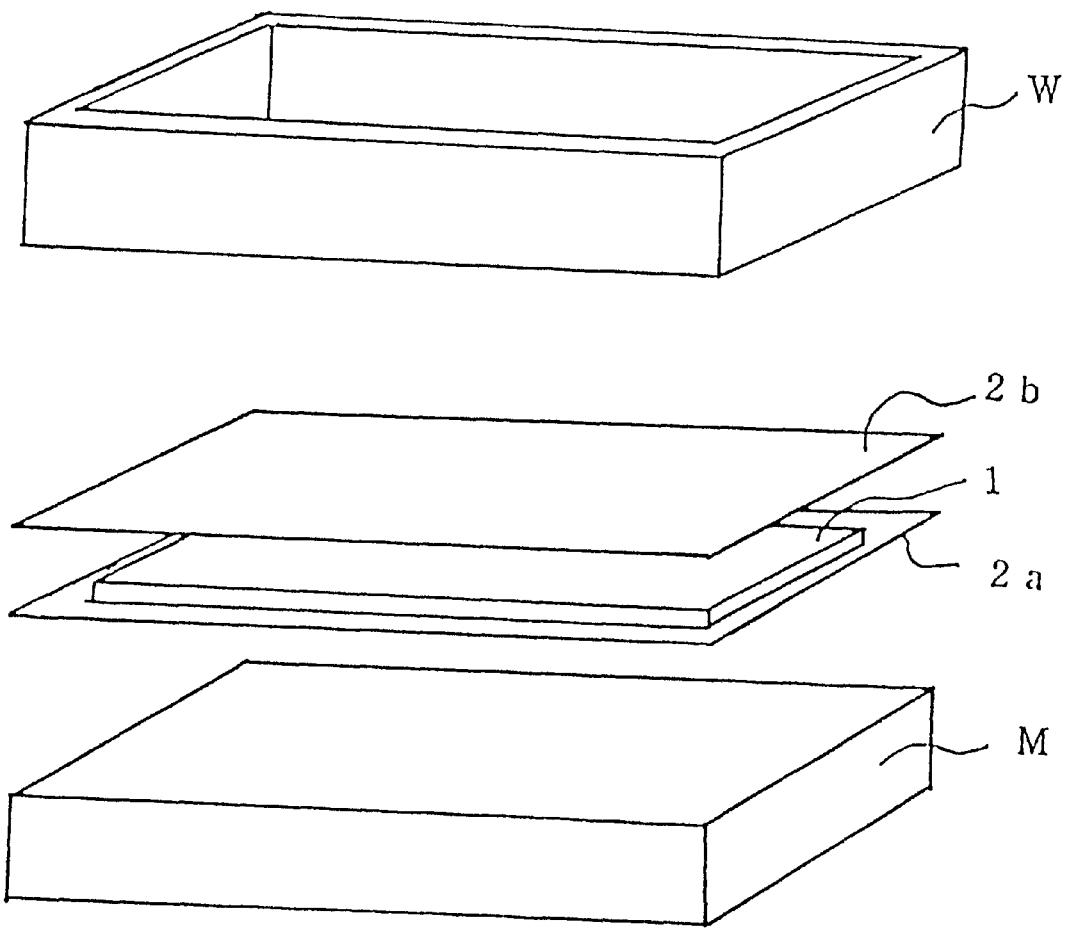
FIG. 1 is a perspective view for showing procedures adopted in an example of the invention.

According to a method of manufacturing a sealed battery of the invention, in sealing an opening with an electrical insulating sealant S, an electrical insulating sealing material C including a first sealing material A that is molten by heat applied for sealing and a second sealing material B that is more difficult to soften by the heat applied for sealing than the first sealing material A is placed on the opening. This sealing material C is heated and then cooled on the opening, so as to form the electrical insulating sealant S.

A sealed battery according to the invention comprises an electrical insulating sealant S for sealing an opening including a first sealing material A that is molten by heat applied for sealing and a second sealing material B that is more difficult to soften by the heat applied for sealing than the first sealing material A.

The first sealing material A is not herein specified and can be any electrical insulating sealing materials as far as a part of or all the material can be thermally molten to be adhered onto a material of a housing or the like in the opening. Preferable examples of the first sealing material A include polyolefins such as polyethylene, polypropylene and polybutene, among which polyethylene and polypropylene having a melting point of 110° C. through 170° C. are more preferred.

The second sealing material B can be any of electrical insulating sealing materials that are more difficult to soften by the sealing heat than the first sealing material A. Specific examples include poly(ethylene terephthalate), alumina and silica, among which poly(ethylene terephthalate) is preferred. In the case where a material with a significantly low melting point, such as polyethylene, is used as the first sealing material A, polypropylene that has a higher melting point and is more difficult to soften can be used as the second sealing material B. As the second sealing material B, a material that is not substantially softened by the sealing heat is preferably used. In order that the first sealing material A alone is molten but the second sealing material B is not substantially softened during the sealing process, it is preferred, from a view point of sealing workability, that the second sealing material B has a softening point higher by 50° C. or more than the melting point of the first sealing material A. Means for applying the sealing heat is not herein specified. For example, external heating means such as a heater or magnetic induction heating means can be used.

The first sealing material A is not specified in its shape because it is molten in the sealing process. In contrast, the second sealing material B should retain its original shape after the sealing process so as to provide the sealed portion of the housing with the electrical insulting property, and therefore is preferably in the form of a mesh or a powder. More preferably, the second sealing material B is in the form of a mesh which can be entangled with the molten first sealing material A during the sealing process so as to exhibit an effect of suppressing the first sealing material A from flowing out of the opening to be sealed.

The first sealing material A functions not only as a part of the electrical insulating sealant S after the sealing process but also as an adhesive with being partly or entirely molten during the sealing process. In a conventional method of manufacturing a sealed battery, the battery is sealed with this first sealing material A alone. Therefore, the sealing material can flow out of the opening during the sealing process, resulting in occasionally causing a sealing failure. In contrast, according to the method of the invention, the second sealing material B is used in addition to the first sealing material A. The second sealing material B functions as a part of the electrical insulating sealant S after the sealing process similarly to the first sealing material A. In addition, the second sealing material B is more difficult to soften by the sealing heat than the first sealing material A, and hence is more difficult to flow out of the opening to be sealed during the sealing process. Accordingly, when the present method is adopted, even if the housing or the like of the battery is slightly deformed by the sealing heat, a sealing failure and a short-circuit can be avoided.

Other features of the invention will become more apparent in the course of the following descriptions of exemplary embodiments which are given for illustration of the invention and not intended to be limiting thereof.

Various kinds of card type sealed lithium secondary batteries, respectively using different sealants in their openings, were manufactured as follows, so as to examine the incidence of a short-circuit and the capacity degradation ratio during charge-discharge cycles.

Manufacture of batteries A1 through A6

Preparation of Positive Electrode:

A mixture including $LiCoO_2$ serving as a positive electrode active material, artificial graphite serving as a conducting agent, and poly(vinylidene fluoride) serving as a binder in a ratio by weight of 8:1:1 and N-methyl-2-pyrrolidone were kneaded to give a slurry. The slurry was applied on one surface of an aluminum foil serving as a collector by a doctor blade method, and the resultant foil was dried under vacuum at a temperature of 150° C. for 2 hours. In this manner, a plate-shaped positive electrode (with a size of 6.4 cm×2.4 cm×0.15 cm) was prepared.

Preparation of Negative Electrode:

A mixture including a natural graphite powder (having a lattice spacing $d_{002}$ between lattice planes (002) of 3.35 Å and an Lc, a crystallite size in the c-axis direction, exceeding 1000 Å) serving as a lithium ion intercalating agent and poly(vinylidene fluoride) serving as a binder in a ratio by weight of 9:1 and N-methyl-2-pyrrolidone were kneaded to give a slurry. The slurry was applied on one surface of a copper foil serving as a collector by the doctor blade method, and the resultant foil was dried under vacuum at a temperature of 150° C. for 2 hours. In this manner, a plate-shaped negative electrode (with a size of 6.6 cm×2.6 cm×0.15 cm) was prepared.

Preparation of Electrolyte Solution:

An electrolyte solution was prepared by dissolving, in a concentration of 1 mole per liter, $LiPF_6$ in a mixed solvent including ethylene carbonate and diethyl carbonate in a ratio by volume of 1:1.

Manufacture of Batteries:

Card type sealed lithium secondary batteries were manufactured by using the aforementioned positive and negative electrodes and electrolyte solution. The manufacturing procedures for these sealed batteries will now be described with reference to the accompanying drawings.

With regard to each battery, an electrode body 1 was fabricated by successively stacking the positive electrode, a separator impregnated with the electrolyte solution and the negative electrode. Also, two sheets of a first sealing material A each with a length of 9 cm, a width of 5 cm and a thickness of 100 μm were respectively cut, at the centers thereof, into a size with a length of 7 cm and a width of 3 cm. Thus, two sheets of the first sealing material A to be used in each battery were obtained. Then, a 30-mesh sheet of a second sealing material B was cut, at the center thereof, into a size with a length of 7 cm and a width of 3 cm. Thus, the second sealing material B to be used in each battery was obtained. The second sealing material B was sandwiched between the two sheets of the first sealing material A, thereby preparing an electrical insulating sealing material C for each battery. However, in batteries A5 and A6, another type of electrical insulating sealing material C obtained as follows was used: 0.1 g of a powder (of the second sealing material B) with an average particle size of 20 μm was sandwiched between two sheets (of the first sealing material A) each with a length of 9 cm, a width of 5 cm and a thickness of 100 μm. The resultant sheets were pressed at a pressure of 100 kgf/cm², thereby obtaining a sheet with a thickness of 230 μm. This sheet was cut, at the center thereof, into a size with a length of 7 cm and a width of 3 cm, which was used as the electrical insulating sealing material C for these batteries.

Next, as is shown in FIG. 1, a negative electrode housing member 2a of a stainless foil (SUS 304) was placed on a support M. The electrode body 1 was placed at the center of the negative electrode housing member 2a, and the sealing material C (not shown) was placed in the periphery of the negative electrode housing member 2a. Thereafter, a positive electrode housing member 2b of an aluminum foil was placed on top.

Figure 2:
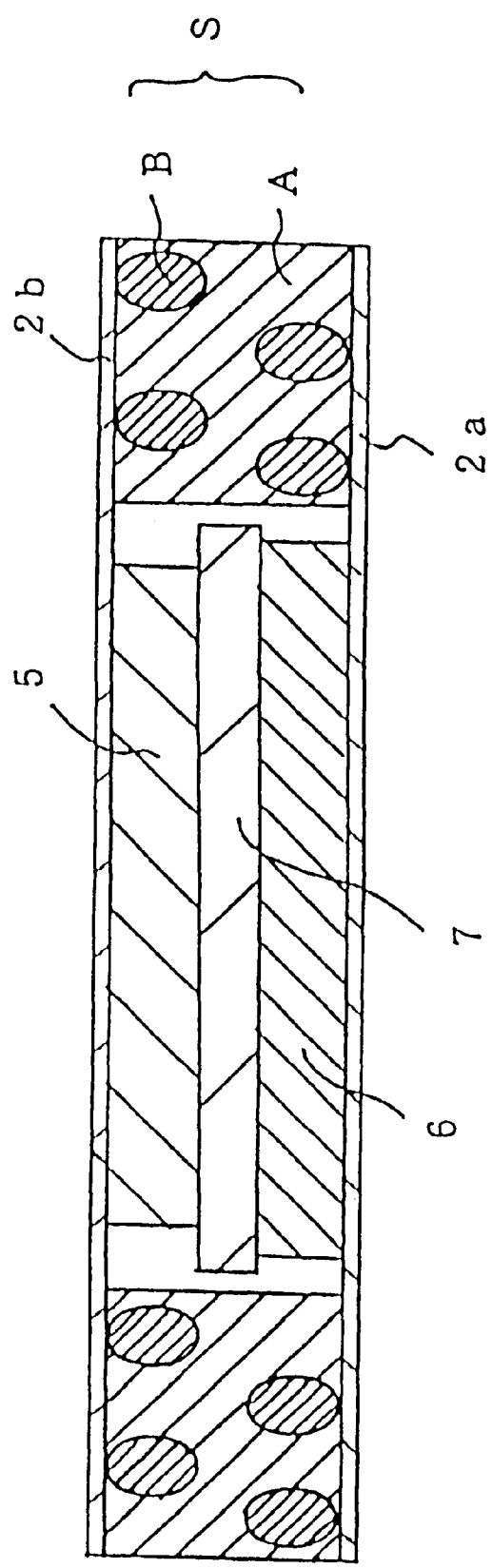
FIG. 2 is a sectional view of a lithium secondary battery manufactured in the example of the invention.

Then, an elevation type mold W for sealing (with a frame having a thickness of 1 cm) connected with a heater (not shown) was lowered. With a pressure of 5 kgf/cm² applied to the positive electrode housing member 2b, the mold W was heated to a temperature of 140° C. (whereas 170° C. and 215° C. in manufacture of batteries A3 and A4, respectively) by turning the heater on, and the temperature was retained for 5 seconds, thereby melting the first sealing material A. Thereafter, the heater was turned off so as to decrease the temperature of the mold W, and thus, the negative electrode housing member 2a and the positive electrode housing member 2b were adhered to the electrical insulating sealing material C. In this manner, each of batteries A1 through A6 was manufactured. These batteries are present batteries manufactured in accordance with the invention. FIG. 2 is a schematic sectional view of the present battery thus manufactured. The present battery X of FIG. 2 comprises a positive electrode 5, a negative electrode 6, a separator 7, the negative electrode housing member 2a, the positive electrode housing member 2b and the sealant S.

The sealant S includes the first sealing material A that is molten by the heat applied for sealing and the second sealing material B (in the form of a mesh in FIG. 2) that is more difficult to soften by the heat applied for sealing than the first sealing material A, and the sealant S has an electrical insulating property. Since the present battery X thus comprises the sealant S including the second sealing material B that is difficult to soften by the heat applied for sealing, the battery has less fear of short-circuit. In addition, there is less fear of a sealing failure, and hence, the capacity scarcely decreases through repeated charge-discharge cycles.

Manufacture of Battery C1:

A battery C1 was manufactured in the same manner as described above with regard to the battery A1 (sealed at a temperature of 140° C.) except that two sheets of polyethylene (i.e., the first sealing material A) alone were stacked to obtain the electrical insulating sealing material. The battery C1 is a comparative battery manufactured by a conventional method.

Table 1 lists the first sealing materials A and the second sealing materials B used in the respective batteries, whereas a softening point of Table 1 is a vicat softening temperature.

TABLE 1

| Battery | First sealing material A | Second sealing material B |
|---|---|---|
| A1 | polyethylene (melting point: 135° C.) | poly(ethylene terephthalate) (mesh) (softening point: 255° C.) |
| A2 | polyethylene (melting point: 135° C.) | polypropylene (mesh) (softening point: 150° C.) |
| A3 | polypropylene (melting point: 165° C.) | poly(ethylene terephthalate) (mesh) (softening point: 255° C.) |
| A4 | polybutene (melting point: 210° C.) | poly(ethylene terephthalate) (mesh) (softening point: 255° C.) |
| A5 | polyethylene (melting point: 135° C.) | poly(ethylene terephthalate) powder with average particle size of 20 μm) (softening point: 255° C.) |
| A6 | polyethylene (melting point: 135° C.) | alumina (powder with average particle size of 20 μm) (not softened at 300° C. or lower) |
| C1 | polyethylene (melting point: 135° C.) | not used |

Short-circuit Test:

Internal resistances of 100 batteries were measured with regard to each of the aforementioned kinds of batteries so as to examine the incidence (%) of a short-circuit battery. A battery having an internal resistance of 1 Ω or less at 1 kHz was determined to be a short-circuit battery. The thus obtained incidence is shown in Table 2:

TABLE 2

| Battery | Incidence of short-circuit (%) |
|---|---|
| A1 | 1 |
| A2 | 4 |
| A3 | 1 |
| A4 | 3 |
| A5 | 1 |
| A6 | 1 |
| C1 | 11 |

As is shown in Table 2, the incidence of short-circuit in the present batteries A1 through A6 is much lower than that in the comparative battery C1 manufactured by the conventional method. In particular, the incidence of short-circuit is as low as merely 1% in the batteries A1, A3, A5 and A6, in which a difference between the melting point of the first sealing material A and the softening point of the second sealing material B is 50° C. or more.

Capacity Degradation Ratio:

With regard to twenty batteries of each kind where no short-circuit was caused, 200 charge-discharge cycles were run, in which each battery was charged at 50 mA to 4.1 V and discharged at 50 mA to 2.8 V. Thus, an average capacity degradation ratio per cycle (%/cycle) up to the 200th cycle defined by the following formula was obtained. The thus obtained ratios are shown in Table 3, wherein the capacity degradation ratio is an average of those obtained in the twenty batteries of each kind.

Capacity degradation ratio={(discharge capacity in 1st cycle—discharge capacity in 200th cycle)/discharge capacity in 1st cycle}÷199 (cycles)×100

TABLE 3

| Battery | Discharge degradation ratio (%/cycle) |
|---|---|
| A1 | 0.07 |
| A2 | 0.10 |
| A3 | 0.07 |
| A4 | 0.09 |
| A5 | 0.07 |
| A6 | 0.14 |
| C1 | 0.22 |

As is shown in Table 3, the capacity degradation ratios of the present batteries A1 through A6 manufactured by the present method are much lower than that of the comparative battery C1 manufactured by the conventional method. Furthermore, the capacity degradation ratio is particularly low in the batteries A1 and A3 through A5 which include poly(ethylene terephthalate) as the second sealing material B. This seems because entanglement (integration) between poly(ethylene terephthalate) and polyolefin is so good that a sealing failure scarcely occurs.

Obviously, numerous modifications and variations of the present invention are possible in light of the above teachings. It is therefore to be understood that within the scope of the appended claims the invention may be practiced otherwise than as specifically described herein.

What is claimed is:

1. A method of manufacturing a sealed battery comprising a step of forming an electrical insulating sealant S for sealing an opening by placing an electrical insulating material C, including a first sealing material A that is molten by heat applied for sealing and a second sealing material B that is in the form of a mesh or a powder and that is more difficult to soften by the heat applied for sealing than the first sealing material A, on the opening and heating the electrical insulating material C at a temperature sufficient to melt the first sealing material A but at which the second sealing material B is not substantially softened and successively cooling the electrical insulating sealing material C.

2. The method of manufacturing a sealed battery according to claim 1, wherein the first sealing material A is polyolefin, and the second sealing material B is poly(ethylene terephthalate), alumina or silica.

3. The method of manufacturing a sealed battery according to claim 1, wherein the first sealing material A is polyethylene or polypropylene having a melting point of 110° C. through 170° C., and the second sealing material B is poly(ethylene terephthalate).

4. The method of manufacturing a sealed battery according to claim 1, wherein there is a difference of 50° C. or more between a melting point of the first sealing material A and a softening point of the second sealing material B.

* * * * *